(12) United States Patent
Remillard et al.

(10) Patent No.: US 9,676,386 B2
(45) Date of Patent: Jun. 13, 2017

(54) SYSTEM AND METHOD FOR CONTROLLING VEHICLE COMPONENTS BASED ON CAMERA-OBTAINED IMAGE INFORMATION

(71) Applicant: Ford Global Technologies, LLC, Dearborn, MI (US)

(72) Inventors: Jeffrey Thomas Remillard, Ypsilanti, MI (US); John Shutko, Ann Arbor, MI (US); Cynthia M Neubecker, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/730,080

(22) Filed: Jun. 3, 2015

(65) Prior Publication Data
US 2016/0355182 A1   Dec. 8, 2016

(51) Int. Cl.
*B60W 30/14* (2006.01)
*G01C 21/36* (2006.01)
*B60Q 9/00* (2006.01)

(52) U.S. Cl.
CPC .............. *B60W 30/14* (2013.01); *B60Q 9/00* (2013.01); *G01C 21/3602* (2013.01); *B60W 2420/42* (2013.01)

(58) Field of Classification Search
CPC ........ G01C 21/34; G01C 21/32; G08G 1/056; G01S 13/723
See application file for complete search history.

(56) References Cited

U.S. PATENT DOCUMENTS

| 5,646,591 A | 7/1997 | Issa et al. |
| 5,931,888 A * | 8/1999 | Hiyokawa ............... G01C 21/34 701/411 |
| 6,226,590 B1 * | 5/2001 | Fukaya .................. G01C 21/34 701/428 |
| 6,560,529 B1 | 5/2003 | Janssen |
| 7,289,019 B1 | 10/2007 | Kertes |
| 7,501,937 B2 | 3/2009 | Flick |

(Continued)

FOREIGN PATENT DOCUMENTS

| DE | 102012102317 A1 | 9/2013 |
| EP | 2208967 A1 | 7/2010 |
| JP | 2006321357 A | 11/2006 |

*Primary Examiner* — Aaron L Troost
*Assistant Examiner* — Martin Weeks
(74) *Attorney, Agent, or Firm* — James P. Muraff; Neal, Gerber & Eisenberg LLP

(57) ABSTRACT

Various embodiments of the present disclosure provide systems and methods for provide monitoring a vehicle's surroundings, predicting when a navigation route will pass through a closed road, preemptively modifying the navigation route to avoid the closed road, identifying changes in speed limit, and identifying dangerous debris in the roadway. One embodiment of the camera-based vehicle control system includes a camera configured to obtain image information and a processor configured to: analyze the image information; if a reroute condition is satisfied based on the image information, implement an alternate navigation route; if a threat condition is satisfied based on the image information, cause an output device to output a threat alert; and if a speed condition is satisfied based on the image information, modify a vehicle speed setting.

19 Claims, 6 Drawing Sheets

(56) References Cited

U.S. PATENT DOCUMENTS

| | | | |
|---|---|---|---|
| 8,049,659 B1 | 11/2011 | Sullivan et al. | |
| 8,310,353 B2 | 11/2012 | Hinninger et al. | |
| 8,370,755 B2 | 2/2013 | Buecker et al. | |
| 8,504,283 B2 | 8/2013 | Aso et al. | |
| 8,589,061 B2 | 11/2013 | Bengtsson et al. | |
| 8,600,587 B1 | 12/2013 | Seah et al. | |
| 9,008,369 B2* | 4/2015 | Schofield | G06K 9/00818 348/211.13 |
| 9,091,558 B2 | 7/2015 | Su et al. | |
| 2006/0009188 A1* | 1/2006 | Kubota | G08G 1/096725 455/344 |
| 2006/0031015 A1 | 2/2006 | Paradie | |
| 2008/0211690 A1 | 9/2008 | Kinasewitz et al. | |
| 2010/0004855 A1* | 1/2010 | Liao | G01C 21/32 701/532 |
| 2010/0253541 A1* | 10/2010 | Seder | G01S 13/723 340/905 |
| 2013/0181860 A1 | 7/2013 | Le et al. | |
| 2013/0321628 A1 | 12/2013 | Eng et al. | |
| 2014/0050362 A1* | 2/2014 | Park | G06K 9/00791 382/104 |
| 2014/0063232 A1 | 3/2014 | Fairfield et al. | |
| 2015/0112731 A1 | 4/2015 | Binion et al. | |
| 2016/0003630 A1* | 1/2016 | Higuchi | G08G 1/056 701/41 |

\* cited by examiner

SYSTEM AND METHOD FOR CONTROLLING VEHICLE COMPONENTS BASED ON CAMERA-OBTAINED IMAGE INFORMATION

TECHNICAL FIELD

The present disclosure generally relates to a system and method for controlling one or more components of a vehicle based on image information obtained from the vehicle's camera. More particularly, the camera-based vehicle control system is configured to review the obtained image information to determine appropriate instances at which to control various components of the vehicle.

BACKGROUND

When a driver of a vehicle is following directions output by her vehicle's navigation system while following a navigation route toward her destination, the navigation system may attempt to guide the driver onto or through a road that is closed. That is, the navigation route implemented by the navigation system passes through the closed road. In these instances, the driver would need to manually adjust the navigation route such that the navigation route avoids passing through the closed road. When driving in proximity to closed roads, the driver is typically within a construction zone. Construction zones usually have lower-than-expected speed limits that are identified by nonstandard signs. Construction zones are generally chaotic and in certain instances full of debris that may make its way onto the roadway. The driver must be ever-vigilant to recognize the speed limit changes and identify dangerous debris in the roadway. The driver may benefit from a system that monitors the vehicle's surroundings, predicts when the navigation route will pass through a closed road, preemptively modifies the navigation route to avoid the closed road, identifies changes in the speed limit, and identifies dangerous debris in the roadway.

SUMMARY

This application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detailed description, and such implementations are intended to be within the scope of this application.

Exemplary embodiments provide systems and methods for monitoring a vehicle's surroundings using a camera, predicting when a navigation route will pass through a closed road, preemptively modifying the navigation route to avoid the closed road, identifying changes in the speed limit, and identifying dangerous debris in the roadway.

According to some embodiments, a camera-based vehicle control system includes a camera configured to obtain image information and a processor configured to: analyze the image information; if a reroute condition is satisfied based on the image information, implement an alternate navigation route; if a threat condition is satisfied based on the image information, cause an output device to output a threat alert; and if a speed condition is satisfied based on the image information, modify a vehicle speed setting.

According to other embodiments, a camera-based vehicle control method comprises: obtaining, by a camera, image information; analyzing, by a processor, the image information; if a reroute condition is satisfied based on the image information, implementing an alternate navigation route; if a threat condition is satisfied based on the image information, causing an output device to output a threat alert; and if a speed condition is satisfied based on the image information, modifying a vehicle speed setting.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Figure 1:
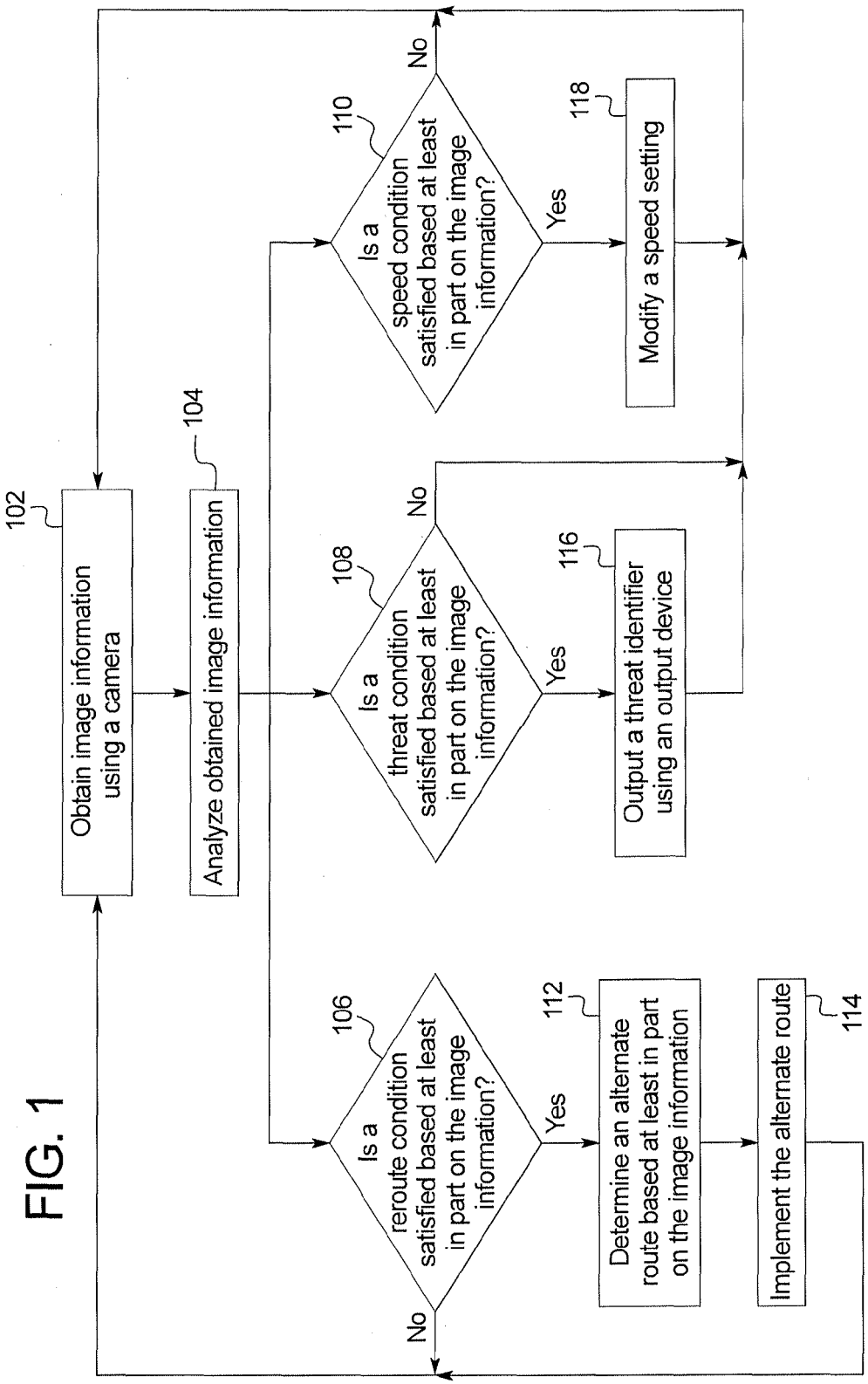
FIG. 1 is a flowchart illustrating a process for operating one example embodiment of the camera-based vehicle control system of the present disclosure.

While the camera-based vehicle control system and method of the present disclosure may be embodied in various forms, there are shown in the drawings, and will hereinafter be described, some exemplary and non-limiting embodiments of the camera-based vehicle control system and method. The present disclosure is to be considered an exemplification of the camera-based vehicle control system and method and is not intended to limit the camera-based vehicle control system and method to the specific embodiments illustrated and described herein. Not all of the depicted components described in this disclosure may be required, however, and some embodiments may include additional, different, or fewer components from those expressly described herein. Variations in the arrangement and type of the components may be made without departing from the spirit or scope of the claims set forth herein.

Various embodiments of the present disclosure provide a system and method for controlling one or more vehicle components based on camera-obtained image information. Generally, the camera-based vehicle control system of the present disclosure includes a camera configured to obtain image information of an external vicinity generally forward of a vehicle and a processor configured to analyze the image information, determine if one or more conditions are satisfied based (at least in part) on the image information, and control one or more components of and/or modify one or more settings of the vehicle (or its components) if any of the Conditions are satisfied. More specifically, in certain embodiments, the processor is configured to: (1) determine if a reroute condition is satisfied based at least in part on the image information, and if so is configured to alter a navigation route being implemented by the vehicle's navigation system; (2) determine if a threat condition is satisfied based at least in part on the image information, and if so is configured to cause an output device of the vehicle (such as the vehicle's speakers or a light source on the vehicle's dashboard) to output a threat alert; and (3) determine if a speed condition is satisfied based at least in part on the image information, and if so is configured to modify a speed setting of the vehicle (such as the vehicle's cruise control speed setting).

The components of the camera-based vehicle control system of the present disclosure (described in detail below) may be included on, within, or otherwise integrated with a vehicle. One or more of the components of the camera-based vehicle control system may be shared with one or more components of existing vehicle systems, such as (but not limited to) the navigation system.

The camera-based vehicle control system may be included in or otherwise usable with any suitable vehicle, such as (but not limited to): (1) a non-commercial passenger vehicle such as a sedan or a truck; (2) a commercial vehicle such as a tractor-trailer; or (3) a non-civilian vehicle such as a vehicle used by a law enforcement agency, a government agency, an emergency response agency (e.g., a fire response agency), or a medical response agency (e.g., a hospital). This list is not exhaustive, and is provided for exemplary purposes only.

The features, processes, and methods described herein with respect to the capabilities of the camera-based vehicle control system may be implemented by a camera-based vehicle control tool running on the camera-based vehicle control system. The camera-based vehicle control tool may be a program, application, and/or combination of software and hardware that is incorporated on one or more of the components that comprise the camera-based vehicle control system. The camera-based vehicle control tool and the camera-based vehicle control system are described in more detail below (and collectively referred to as the camera-based vehicle control system for brevity).

Although the vehicle and the features corresponding to the camera-based vehicle control system described herein are described below in situations in which the vehicle is moving, it is also within the scope of this disclosure that the same features may apply when the vehicle is in a stationary state (e.g., parked, stopped at a red light, or stopped in traffic).

FIG. 1 is a flowchart of an example process or method 100 of operating the camera-based vehicle control system of the present disclosure. In various embodiments, the process 100 is represented by a set of instructions stored in one or more memories and executed by one or more processors (such as those described below in connection with FIG. 6). Although the process 100 is described with reference to the flowchart shown in FIG. 1, many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this embodiment, the camera-based vehicle control system obtains image information using a camera, as indicated by block 102. For example, a front-facing camera of the vehicle captures digital video of the exterior vicinity of the front of the vehicle. The camera-based vehicle control system analyzes the obtained image information, as indicated by block 104. Continuing with the above example, a processor of the camera-based vehicle control system continuously (or at certain intervals) analyzes the captured digital video to determine if any of the below-identified conditions are met based (at least in part) on the captured digital video.

The camera-based vehicle control system then makes three separate determinations based on the image information. Specifically, the camera-based vehicle control system: (1) determines whether a reroute condition is satisfied based at least in part on the image information, as indicated by diamond 106; (2) determines whether a threat condition is satisfied based at least in part on the image information, as indicated by diamond 108; and (3) determines whether a speed condition is satisfied based at least in part on the image information, as indicated by diamond 110. The camera-based vehicle control system makes these determinations in any suitable order, simultaneously, or substantially simultaneously.

If the camera-based vehicle control system determines at diamond 106 that the reroute condition is satisfied based at least in part on the image information, the camera-based vehicle control system determines an alternate navigation route based at least in part on the image information, as indicated by block 112 and implements the alternate navigation route, as indicated by block 114. Continuing with the above example, if the processor identifies a road closed sign in the captured digital video and determines that a navigation route being implemented by the vehicle's navigation system passes through that closed road, the processer determines that the reroute condition is satisfied, determines an alternate navigation route that avoids the closed road, and causes the navigation system to implement the alternate navigation route in place of the currently-implemented navigation route. The process 100 then returns to block 102. If, on the other hand, the camera-based vehicle control system determines at diamond 106 that the reroute condition is not satisfied, the process 100 returns to block 102. Continuing with the above example, if the processor identifies the road closed sign but instead determines that the navigation route being implemented by the vehicle's navigation system does not pass through that closed road, the processor determines that the reroute condition is not satisfied.

If the camera-based vehicle control system determines at diamond 108 that the threat condition is satisfied based at least in part on the image information, the camera-based vehicle control system outputs a threat alert using an output device, as indicated by block 116. Continuing with the above example, if the processor identifies debris in the roadway in the captured digital video, the processor determines that the threat condition is satisfied and causes the vehicle's speakers to output a threat alert in the form of a repetitive beeping sound. The process 100 then returns to block 102. If, on the other hand, the camera-based vehicle control system determines at diamond 108 that the threat condition is not satisfied, the process 100 returns to block 102. Continuing with the above example, if the processor identifies debris on the shoulder of the road in the captured digital video, the processor determines that the threat condition is not satisfied.

If the camera-based vehicle control system determines at diamond 110 that the speed condition is satisfied based at least in part on the image information, the camera-based vehicle control system modifies a speed setting of the vehicle, as indicated by block 110. Continuing with the above example, if the processor identifies a speed limit sign in the captured digital video and determines that the vehicle's cruise control speed setting is higher than the identified speed limit, the processor determines that the speed condition is satisfied and modifies the vehicle's cruise control speed setting to match the identified speed limit. The process 100 then returns to block 102. If, on the other hand, the camera-based vehicle control system determines at diamond 110 that the speed condition is not satisfied, the process 100 returns to block 102. Continuing with the above example, if the processor identifies a speed limit sign in the captured digital video but determines that the vehicle's cruise control speed setting is equal to the identified speed limit, the processor determines that the speed condition is not satisfied.

Each condition and the corresponding action(s) performed by the system when the system determines that that condition is satisfied is explained in detail below.

Obtaining Image Information

As noted above, the camera-based vehicle control system obtains image information, such as digital still images, streaming video, and/or digital video, via one or more suitable cameras (or other imaging devices) on, integrated into, or otherwise associated with the vehicle. At least one of the cameras is oriented so as to obtain image information in the vicinity of and generally forward of the vehicle. This enables the camera to obtain image data of road signs and other objects that are generally viewable from the perspective of the driver of the vehicle.

In certain embodiments (and as described in detail below), the one or more cameras are in communication with and configured to transmit the obtained image information to the processor of the camera-based vehicle control system to enable the processor to analyze the image information. In other embodiments (and as described in detail below), the one or more cameras are in communication with and configured to transmit the obtained image information to a memory device, which subsequently stores the image information. The processor may review the image information by accessing the memory device.

Reroute Condition

As noted above, when the camera-based vehicle control system determines that the reroute condition is satisfied based at least in part on the image information obtained from the camera, the camera-based vehicle control system determines an alternate navigation route that differs from the navigation route being implemented by the vehicle's navigation system and causes the vehicle's navigation system to implement the alternate navigation route (in place of the currently-implemented navigation route).

In certain embodiments, the camera-based vehicle control system determines that the reroute condition is satisfied when: (1) the vehicle's navigation system is implementing a navigation route, and (2) the camera-based vehicle control system determines based on the image information that a road that the currently-implemented navigation route passes through is closed. Put differently, in these embodiments, the reroute condition is satisfied when the camera-based vehicle control system determines that the vehicle's navigation system will direct the driver to drive on or onto a closed road.

The camera-based vehicle control system may determine that a road is closed based on the image information in any of a variety of manners. In various embodiments, the camera-based vehicle control system analyzes the image information by searching the image information for images of particular road signs (which may be included in a database stored on a memory device), such as "Road Closed" signs, "Detour" signs, "No Thru Traffic" signs, "Local Traffic Only" signs, and any other suitable signage. In other embodiments, the camera-based vehicle control system analyzes the image information by searching the image information for objects (such as cones, barrels, barriers, construction equipment, emergency vehicles, and the like) that block an entire road. The camera-based vehicle control system may employ any suitable image-processing software or tool to analyze the image information.

If the reroute condition is satisfied, the camera-based vehicle control system determines the alternate navigation route that avoids the closed road that the currently-implemented navigation route passes through. In certain embodiments, the camera-based vehicle control system uses the image information to (at least in part) determine the alternate navigation route by determining the length of closed road based on the image information. For instance, a "Road Closed" sign may identify the length of closed road, such as 2 miles. Armed with this information, the camera-based vehicle control system can determine an alternate navigation route that avoids the 2 mile stretch of closed road. In various embodiments, when the camera-based vehicle control system cannot determine the length of closed road based on the image information, the camera-based vehicle control system interfaces with one or more other systems, such as traffic information systems, news information systems, satellite imaging systems, and the like, to determine the length of closed road. In other embodiments, the camera-based vehicle control system does not determine the alternate navigation route, but rather the camera-based vehicle control system sends appropriate information (e.g., the length of closed road) to the vehicle's navigation system, and the vehicle's navigation system determines the alternate navigation route.

Figure 2:
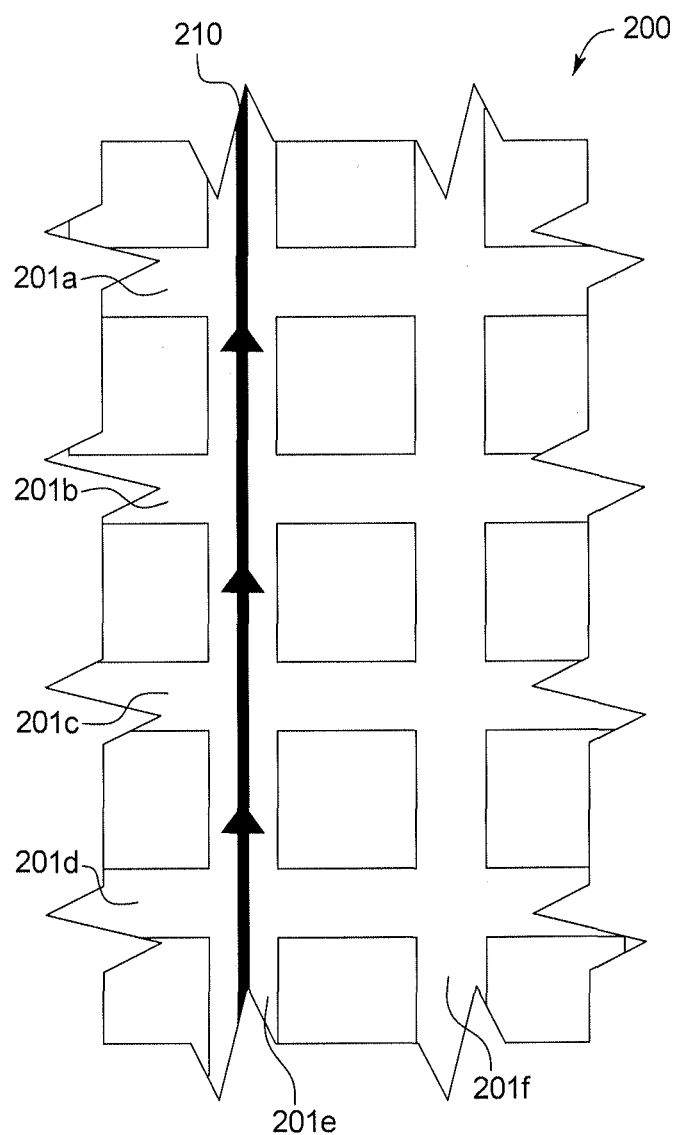
FIG. 2 is a screen shot of a display screen of a navigation system of a vehicle displaying a currently-implemented navigation route that the driver of the vehicle is following.

FIG. 2 is a screen shot 200 of a display screen of a navigation system of a vehicle 220 (shown in FIG. 3) displaying a currently-implemented navigation route that the driver is following. The screen shot 200 includes East-West streets 201a, 201b, 201c, and 201d; North-South streets 201e and 201f; and a navigation route indicator 210. As indicated by the navigation route indicator 210, the currently-implemented navigation route directs the driver to drive north along the street 201e.

Figure 3:
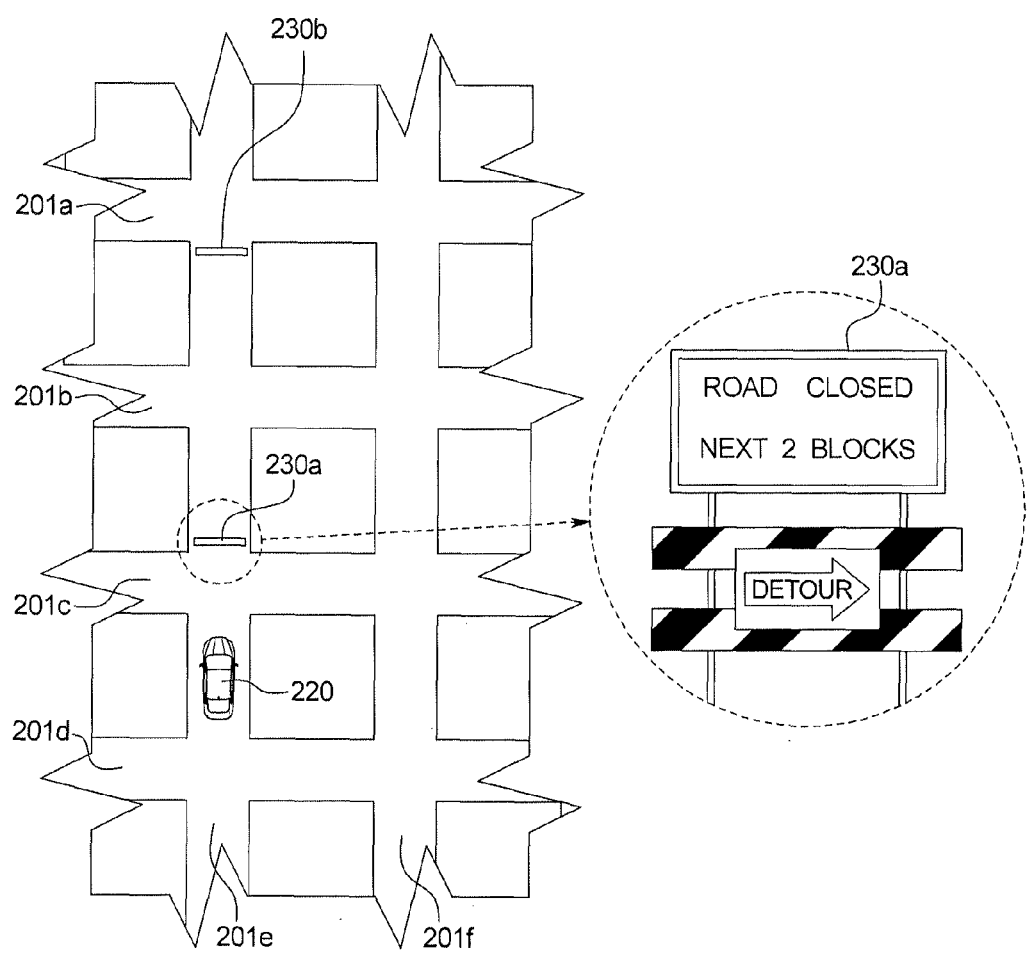
FIG. 3 is a top plan view of the vehicle of FIG. 2 that includes one embodiment of the camera-based vehicle control system of the present disclosure and that is driving on a street along the navigation route shown in FIG. 2.

FIG. 3 is a top plan view of the vehicle 220, which includes one embodiment of the camera-based vehicle control system, driving on the street 201e along the navigation route. Here, barricades 230a and 230b block the street 201e between the streets 201c and 201a. In other words, the street 201e is closed for 2 blocks between streets 201c and 201a. As indicated by the navigation route indicator 210 of FIG. 2, the navigation route currently implemented by the navigation system of the vehicle 220 passes through this closed portion of the street 201e. The camera (not shown) of the Camera-based vehicle control system of the vehicle 220 obtains image information that includes an image of the barricade 230a, which includes a road sign having the text "ROAD CLOSED NEXT 2 BLOCKS" printed thereon. The processor of the camera-based vehicle control system analyzes the obtained image information—including the image of the barricade 230a—and determines that the street 201e is closed for two blocks.

The processor of the camera-based vehicle control system determines that the reroute condition is satisfied in this instance because: (1) the navigation system of the vehicle 220 is implementing a navigation route, and (2) the camera-based vehicle control system determined based on the obtained image information (including the image of the barricade 230a) that the street 201e that the currently-implemented navigation route passes through is closed.

Figure 4:
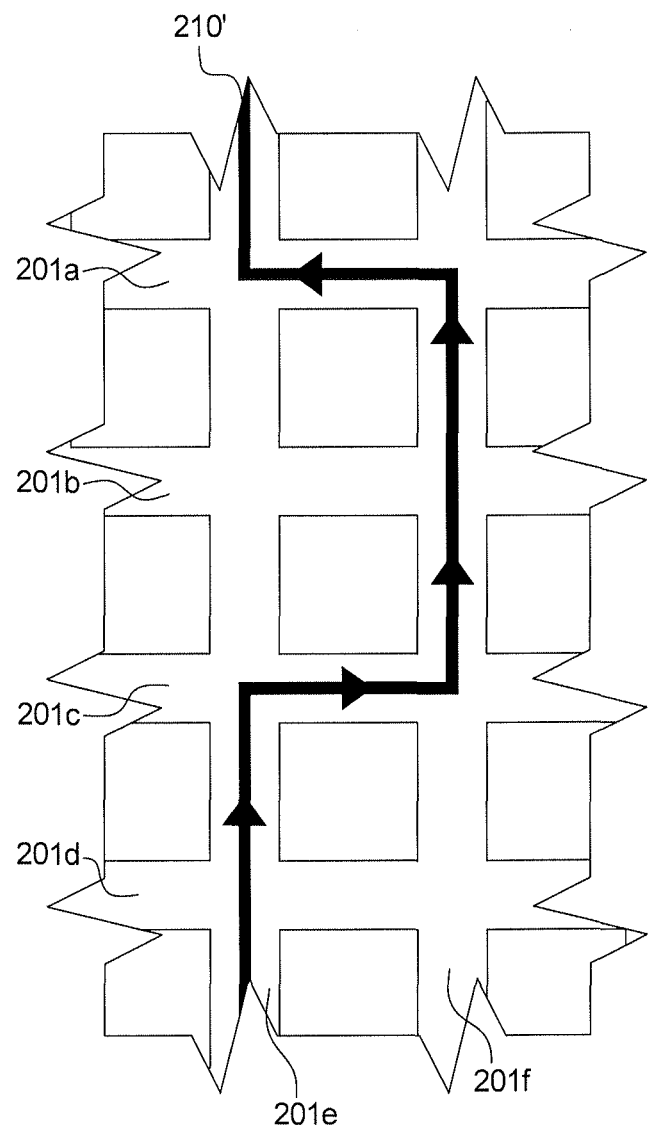
FIG. 4 is a screen shot of the display screen of the navigation system of the vehicle of FIG. 2 displaying an alternate navigation route indicator indicating an alternate navigation route.

Since the reroute condition is satisfied, the camera-based vehicle control system determines an alternate navigation route to avoid the closed stretch of the street 201e. In this example embodiment, the camera-based vehicle control system does so by creating an alternate navigation route that avoids the street 201e for 2 blocks. The camera-based vehicle control system then causes the navigation system of the vehicle 220 to implement the alternate navigation route in place of the currently-implemented navigation route. FIG. 4 is a screen shot 400 of the display screen of the navigation system of the vehicle 220 displaying an alternate navigation route indicator 210' indicating the alternate navigation route in place of the original navigation route indicator 210 shown in FIG. 2. The alternate navigation route avoids the closed stretch of the street 201e by directing the driver east on the street 201c, north on the street 201f, west on the street 201a, and north on the street 201e.

In certain embodiments, when the camera-based vehicle control system determines that the reroute condition is satisfied, the camera-based vehicle control system automatically determines the alternate navigation route and implements the alternate navigation route without driver input. In other embodiments, when the camera-based vehicle control system determines that the reroute condition is satisfied, the camera-based vehicle control system queries the driver—such as via a displayed indication and/or an audio indication—as to whether the driver desires the camera-based vehicle control system to determine and implement an alternate navigation route and enables the driver to input the driver's instructions (e.g., via a touch-screen or voice command). The camera-based vehicle control system determines and implements the alternate navigation route in these embodiments only after receiving driver instructions to do so. In additional embodiments, when the camera-based vehicle control system determines that the reroute condition is satisfied, the camera-based vehicle control system automatically determines the alternate navigation route but queries the driver—such as via a displayed indication and/or an audio indication—as to whether the driver desires the camera-based vehicle control system to implement the alternate navigation route and enables the driver to input the driver's instructions. The camera-based vehicle control system implements the alternate navigation route in these embodiments only after receiving driver instructions to do so.

In other embodiments, rather than determining the entire alternate navigation route up-front, the camera-based vehicle control system dynamically determines the alternate navigation route based on "Detour" signs that the camera-based vehicle control system identifies in the image information. In other words, in these embodiments, once the camera-based vehicle control system determines that a road is closed, the camera-based vehicle control system monitors for and identifies "Detour" signs and dynamically updates the navigation route after identifying each subsequent "Detour" sign. For instance, in one example embodiment, the camera-based vehicle control system determines that a road is closed, identifies a first "Detour" sign pointing east, and updates the navigation route to direct the driver east. The camera-based vehicle control system then identifies a second "Detour" sign pointing north, and the camera-based vehicle control system updates the navigation route to direct the driver north. The camera-based vehicle control system then identifies a third "Detour" sign pointing west, and the camera-based vehicle control system updates the navigation route to direct the driver west. The camera-based vehicle control system then identifies a fourth "Detour" sign pointing north, and the camera-based vehicle control system updates the navigation route to direct the driver north.

Certain embodiments combine this dynamic determination of the alternate navigation route with the up-front determination of the alternate navigation route. For instance, in one example embodiment, the camera-based vehicle control system determines the alternate navigation route up-front, and may modify that alternate navigation route based on subsequently-identified "Detour" signs.

In alternative embodiments, the camera-based vehicle control system determines that the reroute condition is satisfied when the camera-based vehicle control system determines based on the image information that a road that the vehicle is likely to pass through based on the vehicle's current trajectory is closed. Put differently, in these embodiments, the camera-based vehicle control system predicts where the vehicle is going and determines that the reroute condition is satisfied when the vehicle's trajectory will cross paths with a closed road. The vehicle's navigation system need not be implementing a navigation route for the reroute condition to be satisfied in these embodiments. If the reroute condition is satisfied in these embodiments, the camera-based vehicle control system determines an alternate navigation route that avoids the closed road toward which the vehicle is directed (in any of the manners described above) and activates the navigation system to alert the driver that the road is closed and offer the alternate navigation route.

In alternative embodiments, the camera-based vehicle control system determines that the reroute condition is satisfied when: (1) the vehicle's navigation system is implementing a navigation route, and (2) the camera-based vehicle control system determines based on the image information that a road that the currently-implemented navigation route passes through a construction zone. Put differently, in these embodiments, the camera-based vehicle control system determines that the reroute condition is satisfied when the vehicle's navigation system will direct the driver to drive on or onto a road that is under construction. If the reroute condition is satisfied in these embodiments, the camera-based vehicle control system determines an alternate navigation route that avoids the construction zone that the currently-implemented navigation route passes through (in any of the manners described above) and implements the alternate navigation route (in any of the manners described above).

In alternative embodiments, the camera-based vehicle control system determines that the reroute condition is satisfied when the camera-based vehicle control system determines based on the image information that the vehicle is likely to pass through a construction zone based on the vehicle's current trajectory. Put differently, in these embodiments, the camera-based vehicle control system predicts where the vehicle is going and determines that the reroute condition is satisfied when the vehicle's trajectory will cross paths with a construction zone. The vehicle's navigation system need not be implementing a navigation route for the reroute condition to be satisfied in these embodiments. If the reroute condition is satisfied in these embodiments, the camera-based vehicle control system determines an alternate navigation route that avoids the construction zone toward which the vehicle is directed (in any of the manners described above) and activates the navigation system to alert the driver to the construction zone and offer the alternate navigation route.

Threat Condition

As noted above, when the camera-based vehicle control system determines that the threat condition is satisfied based at least in part on the image information obtained from the camera, the camera-based vehicle control system causes an output device of the vehicle to output a threat alert to alert the driver of the threat.

In certain embodiments, the camera-based vehicle control system determines that the threat condition is satisfied when the camera-based vehicle control system determines based on the image information that a threatening object is located in the road along the vehicle's trajectory. Put differently, in these embodiments, the threat condition is satisfied when the camera-based vehicle control system determines that a threatening object is in the vehicle's path.

The camera-based vehicle control system may determine that an object is in the road along the vehicle's trajectory in any of a variety of manners. In various embodiments, the camera-based vehicle control system analyzes the image information by searching the image information for any objects (such as animals, barrels, cones, tire shreds, debris, and the like) located in the vehicle's lane (or in other embodiments within a designated proximity of the vehicle's lane). The camera-based vehicle control system may employ any suitable image-processing software or tool to analyze the image information.

Once the camera-based vehicle control system determines that an object is in the road along the vehicle's trajectory, the camera-based vehicle control system determines whether that object is a threatening object (such as a cow) that would satisfy the threat condition or a non-threatening object (such as a plastic bag) that would not satisfy the threat condition. The camera-based vehicle control system may determine if the object is a threatening object in any of a variety of manners and based on any of a variety of factors. In various embodiments, the camera-based vehicle control system does so by determining one or more characteristics of an object and cross-referencing the characteristic(s) with one or more threatening object characteristics included in a database. If the object has a characteristic or set of threatening object characteristics that matches a threatening object characteristic or set of characteristics, the camera-based vehicle control system designates the object as a threatening object, thereby satisfying the threat condition.

The object characteristics may be any suitable characteristics of the object such as (but not limited to): the type of object; the size of the object; the velocity of the object, the acceleration of the object, the position of the object, the predicted movement/path/trajectory/position/location of the object, or the type of object. The threatening object characteristics may be any suitable subset(s) of these characteristics. For example, in one embodiment, an object having a size of at least one-quarter of the width of the vehicle's lane is a threatening object, an object having the object type of animal is a threatening object, and an object having a predicted trajectory toward the vehicle is a threatening object.

If the camera-based vehicle control system determines that the threat condition is satisfied, the camera-based vehicle control system causes one or more output devices of the vehicle to output a threat alert to alert the driver of the threatening object. For instance, the camera-based vehicle control system may cause: the vehicle's speakers to output an aural threat alert (e.g., a repetitive beep or a voice alert); a light source of the vehicle (e.g., a light on the dashboard) to illuminate; a display screen of the vehicle (e.g., the navigation system display screen) to display a textual alert; a component of the vehicle to vibrate or move (e.g., the steering wheel to vibrate); or any suitable combination thereof. In certain embodiments, the output increases in intensity as the severity of the threat increases (e.g., a cone in the road causes a light on the dashboard to blink while a deer in the road causes the speakers to emit a repetitive beep and the steering wheel to vibrate).

Figure 5:
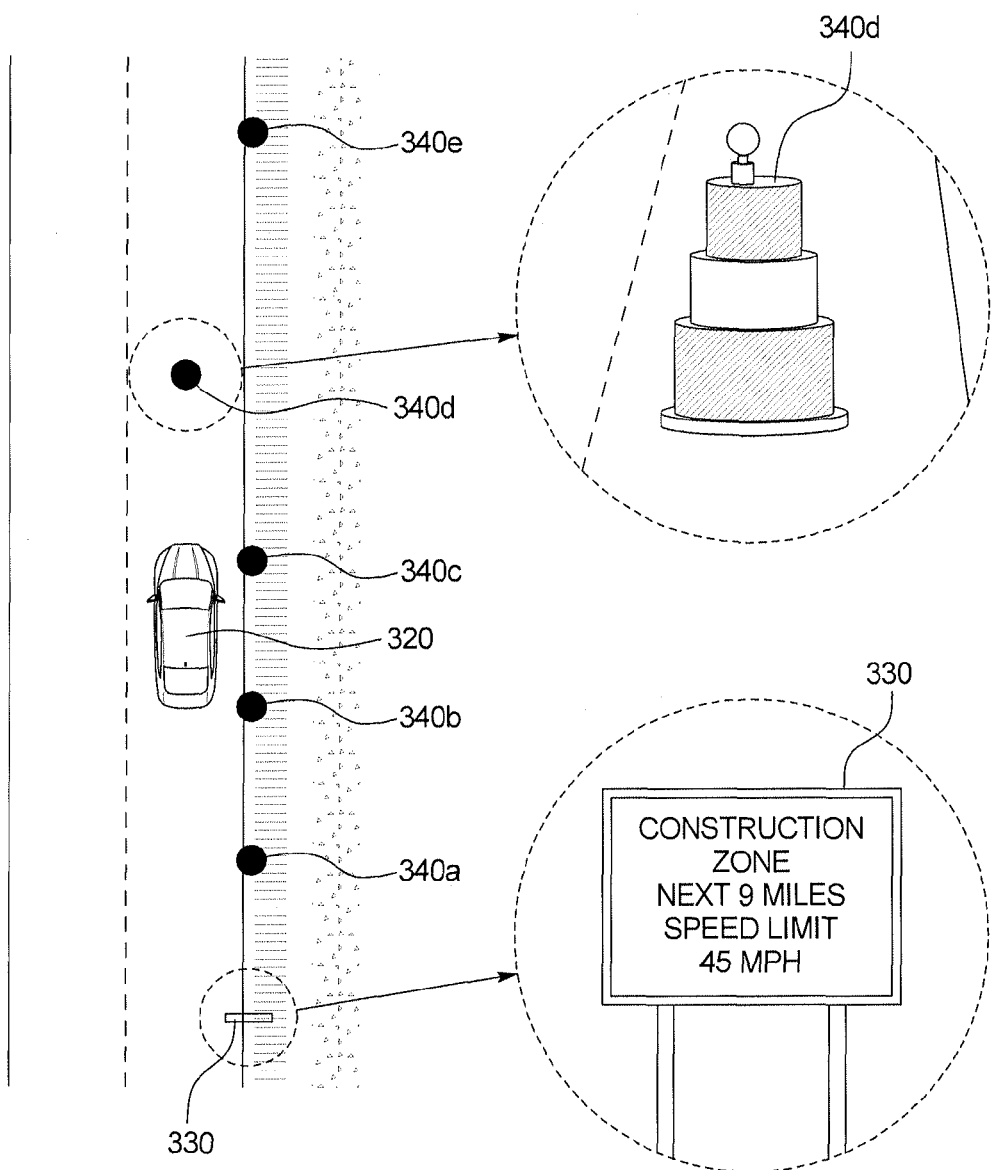
FIG. 5 is a top plan view of another vehicle that includes another embodiment of the camera-based vehicle control system of the present disclosure and that is driving within a construction zone.

FIG. 5 is a top plan view of a vehicle 320, which includes one embodiment of the camera-based vehicle control system, driving on a street 301. A plurality of construction barrels 340a to 340e are positioned along the street 310. Here, construction barrel 340d has been moved within the lane in which the vehicle 320 is driving. The camera (not shown) of the camera-based vehicle control system of the vehicle 320 obtains image information that includes an image of the construction barrel 340d. Here, the processor of the camera-based vehicle control system determines that the threat condition is satisfied because the construction barrel 340d, which is a type of object designated as a threatening object, is located within the vehicle's path. Accordingly, the camera-based vehicle control system causes the vehicle's speakers to output a repetitive beeping sound to alert the driver of the construction barrel 340d in the vehicle's path.

Speed Condition

As noted above, when the camera-based vehicle control system determines that the speed condition is satisfied based at least in part on the image information obtained from the camera, the camera-based vehicle control system modifies a speed setting of the vehicle.

In certain embodiments, the camera-based vehicle control system determines that the speed condition is satisfied when: (1) the vehicle's cruise control is active and controlling the vehicle's speed according to a speed setting, and (2) the camera-based vehicle control system determines based on the image information that the speed setting differs from the posted speed limit. Put differently, in these embodiments, the speed condition is satisfied when the camera-based vehicle control system determines that the vehicle's cruise control is active and set at a higher or a lower speed than the posted speed limit.

The camera-based vehicle control system may determine the posted speed limit based on the image information in any of a variety of manners. In various embodiments, the camera-based vehicle control system analyzes the image information by searching the image information for images of speed limit signs. The camera-based vehicle control system may employ any suitable image-processing software or tool to analyze the image information.

If the speed condition is satisfied, the camera-based vehicle control system changes the speed setting of the vehicle's cruise control to match the posted speed limit.

Returning to FIG. 5, a construction zone speed limit sign 330 is posted along the side of the road 301. The camera (not shown) of the camera-based vehicle control system of the vehicle 320 obtained image information that included an image of the construction zone speed limit sign 330. Here, the processor of the camera-based vehicle control system determined based on the construction zone speed limit sign 330 that the posted speed limit is 45 miles-per-hour, and determined that the speed condition was satisfied because the cruise control of the vehicle 320 was active and controlling the vehicle's speed according to a 65 miles-per-hour speed setting. Accordingly, the camera-based vehicle control system reduced the vehicle's cruise control speed setting from 65 miles-per-hour to 45 miles-per-hour to comply with the newly-identified posted construction zone speed limit.

In certain embodiments, when the camera-based vehicle control system determines that the speed condition is satisfied, the camera-based vehicle control system automatically modifies the vehicle's speed setting without driver input. In other embodiments, when the camera-based vehicle control system determines that the speed condition is satisfied, the camera-based vehicle control system queries the driver—such as via a displayed indication and/or an audio indication—as to whether the driver desires the camera-based vehicle control system to modify the vehicle's speed setting and enables the driver to input the driver's instructions. The camera-based vehicle control system modifies the vehicle's speed setting only after receiving driver instructions to do so.

Variations

In certain embodiments, rather than rely solely on image information to determine whether any of the reroute condition, the threat condition, and the speed condition are satisfied, the camera-based vehicle control system also uses information obtained from one or more vehicle sensors to determine whether any of these conditions are satisfied.

For instance, the vehicle may include, and the camera-based vehicle control system may be configured to communicate with, one or more sensors such as a radar sensor, an infrared sensor, and/or an ultrasonic sensor. The camera-based vehicle control system may receive information or data from one or more of these sensors. The camera-based vehicle control system can then use this information to determine whether any of the conditions are satisfied.

Camera-Based Vehicle Control System Components

Figure 6:
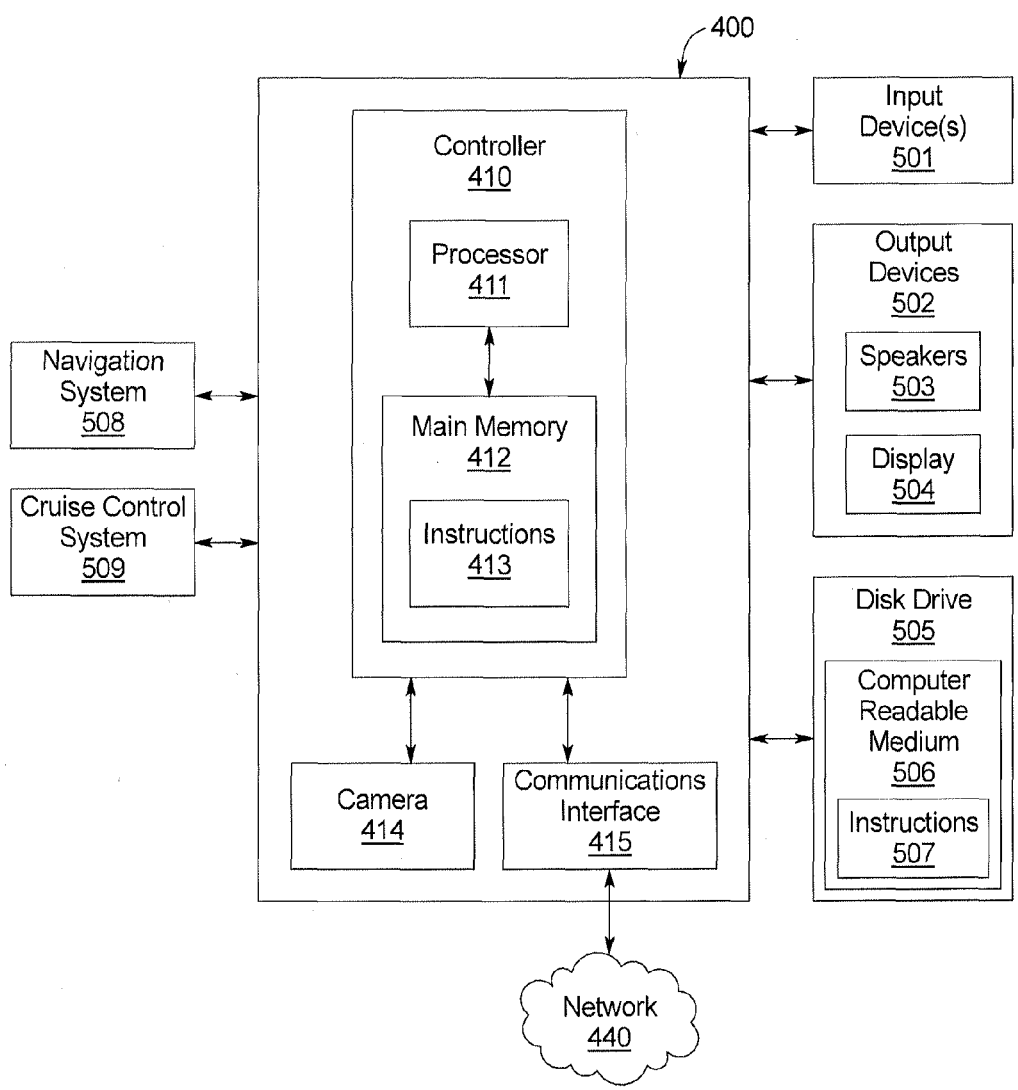
FIG. 6 illustrates a block diagram including components of one embodiment of the camera-based vehicle control system of the present disclosure.

FIG. 6 illustrates one example embodiment of the camera-based vehicle control system 400. Other embodiments of the camera-based vehicle control system may include different, fewer, or additional components than those described below and shown in FIG. 6.

The camera-based vehicle control system 400 includes a controller 410 comprised of at least one processor 411 in communication with a main memory 412 that stores a set of instructions 413. The processor 411 is configured to communicate with the main memory 412, access the set of instructions 413, and execute the set of instructions 413 to cause the camera-based vehicle control system 400 to perform any of the methods, processes, and features described herein. The camera-based vehicle control system 400 also includes a camera 414 (described above) in communication with the controller 410 and a communications interface 415 in communication with the controller 410.

The processor 411 may be any suitable processing device or set of processing devices such as, but not limited to: a microprocessor, a microcontroller-based platform, a suitable integrated circuit, or one or more application-specific integrated circuits (ASICs) configured to execute the set of instructions 413. The main memory 412 may be any suitable memory device such as, but not limited to: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); and/or read-only memory.

The camera-based vehicle control system 400 includes a communications interface 415. The communications interface 415 is comprised of a wired and/or wireless network interface to enable communication with an external network 440. The external network 440 may be a collection of one or more networks, including standards-based networks (e.g., 2G, 3G, 4G, Universal Mobile Telecommunications System (UMTS), GSM® Association, Long Term Evolution (LTE)™, or more); WiMAX; Bluetooth; near field communication (NFC); WiFi (including 802.11a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols.

In some embodiments, the set of instructions 413 stored on the main memory 412 and that are executable to enable the functionality of the camera-based vehicle control system may be downloaded from an off-site server via the external network 440. Further, in some embodiments, the camera-based vehicle control system 400 may communicate with a central command server via the external network 440. For example, the camera-based vehicle control system 400 may communicate image information obtained by the camera of camera-based vehicle control system 400 to the central command server by controlling the communications interface 415 to transmit the image information to the central command server via the external network 440. The camera-based vehicle control system 400 may also communicate any generated data to the central command server.

The camera-based vehicle control system 400 is configured to communicate with a plurality of vehicle components and vehicle systems (such as via one or more communications buses (not shown)) including: one or more input devices 501, one or more output devices 502, a disk drive 505, a navigation system 508 including a global positioning system (GPS) receiver and configured to interface with a GPS to provide location-based information and directions (as known in the art), and a cruise control system 509 (as known in the art).

The input devices 501 may include any suitable input devices that enable a driver or a passenger of the vehicle to input modifications or updates to information referenced by the camera-based vehicle control system 400 as described herein. The input devices 501 may include, for instance, a control knob, an instrument panel, a keyboard, a scanner, a digital camera for image capture and/or visual command recognition, a touch screen, an audio input device (e.g., cabin microphone), buttons, a mouse, or a touchpad.

The output devices may include instrument cluster outputs (e.g., dials, lighting devices), actuators, a display 504 (e.g., a liquid crystal display ("LCD"), an organic light emitting diode ("OLED"), a flat panel display, a solid state display, a cathode ray tube ("CRT"), or a heads-up display), and speakers 503.

The disk drive 505 is configured to receive a computer readable medium 506. In certain embodiments, the disk drive 505 receives the computer-readable medium 506 on which one or more sets of instructions 507, such as the software for operating the camera-based vehicle control system 400, can be embedded. Further, the instructions 507 may embody one or more of the methods or logic as described herein. In a particular embodiment, the instructions 507 may reside completely, or at least partially, within any one or more of the main memory 412, the computer readable medium 506, and/or within the processor 411 during execution of the instructions by the processor 411.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A control system, for a vehicle, comprising:
vehicle camera(s) that capture image(s);
processor(s) configured to:
  parse the image(s) for road closure signs and associated closure lengths;
  generate and display a navigational route based on parsed road closure signs and parsed associated closure lengths;
  determine that one of the images yields a parsed road closure sign, but not a parsed associated closure length, and, in response: query a traffic information server to determine the associated closure length.

2. The control system of claim 1, wherein the processor(s) are configured to: parse the image(s) for the road closure signs and the associated closure lengths via image-processing software, wherein the vehicle camera(s) are directly mounted to the vehicle, and wherein the vehicle includes (i) a motor configured to provide mechanical power to wheel(s) and (ii) batterie(s).

3. The control system of claim 1, wherein the processor(s) are configured to: parse the image(s) for the road closure signs at least partially by comparing the image(s) to pre-stored images of a plurality of different road closure signs.

4. The control system of claim 1, wherein the processor(s) are configured to: generate the navigational route based on parsed road closure signs and parsed associated closure lengths such that the navigational route avoids closed roads for their associated closure lengths.

5. A control system, for a vehicle, comprising:
vehicle camera(s) that capture image(s);
processor(s) configured to:
  parse the image(s) for (i) road closure signs and (ii) associated closure lengths;
  generate and display a navigational route based on parsed road closure signs and parsed associated closure lengths;
  begin parsing the image(s) for detour signs upon detecting a parsed road closure sign;
  determine that one of the images yields a parsed road closure sign, but not a parsed associated closure length, and, in response: query a traffic information server to determine the associated closure length.

6. The control system of claim 5, wherein the processor(s) are configured to: parse the image(s) for the road closure signs and the associated closure lengths via image-processing software, wherein the vehicle camera(s) are directly mounted to the vehicle, and wherein the vehicle includes a motor configured to provide mechanical power to wheel(s) and batterie(s).

7. A control system, for a vehicle, comprising:
vehicle camera(s) that capture image(s);
processor(s) configured to:
  parse the image(s) for (i) road closure signs and (ii) associated closure lengths;
  generate and display a navigational route based on parsed road closure signs and parsed associated closure lengths;
  parse the image(s) for objects and road widths;
  compare widths of the objects to the road widths;
  output threat alerts based on outcomes of the comparisons.

8. The control system of claim 7, wherein the processor(s) are configured to: output threat alerts by generating graphics on a display.

9. The control system of claim 7, wherein the processor(s) are configured to: modulate intensities of the output threat alerts based on determined identities of the parsed objects.

10. The control system of claim 7, wherein the processor(s) are configured to: parse the image(s) for the road closure signs and the associated closure lengths via image-processing software, wherein the vehicle camera(s) are directly mounted to the vehicle, and wherein the vehicle includes (i) a motor configured to provide mechanical power to wheel(s) and (ii) batterie(s).

11. A control system, for a vehicle, comprising:
vehicle camera(s) that capture image(s);
a navigation module that enables user input of a desired navigational route, wherein the navigational route is a readjusted navigational route;
processor(s) configured to:
  parse the image(s) for (i) road closure signs and (ii) associated closure lengths;
  generate and display a navigational route based on parsed road closure signs and parsed associated closure lengths;
  determine an absence of a desired navigational route from the navigation module;
  generate and display the readjusted navigational route based on the parsed road closure signs and the parsed associated closure lengths even when a desired navigational route is absent from the navigation module.

12. The control system of claim 11, wherein the processor(s) are configured to: parse the image(s) for the road closure signs and the associated closure lengths via image-processing software, wherein the vehicle camera(s) are directly mounted to the vehicle, and wherein the vehicle includes (i) a motor configured to provide mechanical power to wheel(s) and (ii) batterie(s).

13. The control system of claim 11, wherein the processor(s) are configured to: determine that one of the images includes a parsed road closure sign, but not a parsed associated closure length, and, in response: query a traffic information server to determine the associated closure length.

14. A control method, for a vehicle, comprising, via processor(s) that received captured image(s) from vehicle camera(s):
   parsing the image(s) for (i) road closure signs and (ii) associated closure lengths;
   generating and displaying a navigational route based on parsed road closure signs and parsed associated closure lengths;
   parsing the image(s) for road closure signs and associated closure lengths via image-processing software;
   parsing the image(s) for the road closure signs by comparing the image(s) to prestored images of a plurality of different road closure signs;
   generating the navigational route based on parsed road closure signs and parsed associated closure lengths such that the navigational route avoids closed roads for their associated closure lengths
   determining that one of the images includes a parsed road closure sign, but not a parsed associated closure length, and, in response: querying a traffic information server to determine the associated closure length.

15. The method of claim 14, further comprising: beginning to parse the image(s) for detour signs upon detecting a parsed road closure sign.

16. The method of claim 15, further comprising:
   parsing the image(s) for objects and road widths;
   comparing widths of the objects to the road widths;
   outputting threat alerts based on outcomes of the comparisons.

17. The method of claim 16, further comprising: outputting the threat alerts by generating graphics on a display.

18. The method of claim 16, further comprising: controlling intensities of the output threat alerts based on determined identities of the parsed objects.

19. The method of claim 18, wherein the navigational route is a readjusted navigational route, and the method further comprises:
   determining an absence of a desired navigational route from a navigation module;
   generating and displaying the readjusted navigational route based on the parsed road closure signs and the parsed associated closure lengths even when a desired navigational route is absent from the navigation module.

* * * * *